United States Patent [19]

Igata et al.

[11] Patent Number: 4,600,952

[45] Date of Patent: Jul. 15, 1986

[54] HELICAL SCAN VIDEO TAPE RECORDER WITH AUXILIARY HEADS FOR BLUR FREE HIGH SPEED REPRODUCTION PICTURES

[75] Inventors: Kouichi Igata, Hirakata; Yoshihiro Deguchi, Kadoma; Masaaki Kobayashi, Kawanishi, all of Japan

[73] Assignee: Matsushita Electric Industrial Co., Ltd., Kadoma, Japan

[21] Appl. No.: 697,894

[22] Filed: Feb. 1, 1985

[51] Int. Cl.$^4$ ............................................ H04N 5/783
[52] U.S. Cl. ..................................... 360/10.3; 360/64
[58] Field of Search ....................... 358/312, 327, 328; 360/10.1, 10.3, 64, 75, 77, 78, 10.2, 107, 108

[56] References Cited

U.S. PATENT DOCUMENTS

| | | | |
|---|---|---|---|
| 4,197,562 | 4/1980 | Kikuya et al. | 360/10.3 |
| 4,293,880 | 10/1981 | Tsukada et al. | 360/10.3 |
| 4,418,366 | 11/1983 | Moriya | 360/10.3 |
| 4,426,666 | 1/1984 | Kobayashi et al. | 360/10.3 |
| 4,486,792 | 12/1984 | Edakubo et al. | 360/10.3 |
| 4,488,185 | 12/1984 | Toba | 360/10.3 |

*Primary Examiner*—Donald McElheny, Jr.
*Attorney, Agent, or Firm*—Wenderoth, Lind & Ponack

[57] ABSTRACT

In a video tape recorder of the helical scan type, two auxiliary magnetic heads having different azimuth angles are provided in the vicinity of two main magnetic heads. The main and auxiliary magnetic heads have their tracks aligned so as to compensate for the reduced period of the reproduction signal of the main magnetic heads during high speed reproduction by using the reproduction signals of the auxiliary magnetic heads. Thus, blur free high speed reproduction pictures may be realized, and, at the same time, a dancing picture correction during still reproduction may be facilitated.

3 Claims, 12 Drawing Figures

1 TRACK PITCH

HELICAL SCAN VIDEO TAPE RECORDER WITH AUXILIARY HEADS FOR BLUR FREE HIGH SPEED REPRODUCTION PICTURES

BACKGROUND OF THE INVENTION

1. Field of the Invention

This invention relates to a video tape recorder (hereinafter referred to as VTR) of helical scan system, in particular, to a VTR capable of obtaining favorable noiseless reproduced pictures in a special reproduction.

2. Description of the Prior Art

In most recent VTRs it is possible to record by freely selecting either the standard playing mode (two-hour mode) or the long playing mode (six-hour mode) according to the linking of the user. When reproducing a recorded magnetic tape, however, the multiple speed reproduction, still reproduction or slow motion reproduction is possible in the long playing mode, but is not possible in the standard playing mode, or if possible in both standard playing mode and long playing mode, several noise bars are reproduced in multiple speed reproduction or picture blurring occurs in frame reproduction in the still reproduction. Thus, the performance was not perfectory satisfactory.

Also, a means to realize field still reproduction without picture blurring or multiple speed reproduction without noise bar in standard playing mode is known by providing two auxiliary magnetic heads (for long playing mode) differing mutually in the azimuth angle in the vicinity of two main magnetic heads (for standard playing mode) differing also mutually in the azimuth angle.

However, in order to realize a field still reproduction in the long playing mode, the track width of the main magnetic head for the standard playing mode is different. Therefore, in the case of multiple speed reproduction mode, the changeover position of the main magnetic heads and auxiliary magnetic heads varies in each field due to the output difference of the reproduction signal caused by the difference in track width, and the picture blurring occurs partially in the vertical direction, thereby lowering the picture quality extremely.

As another problem, V-dancing occurs during field still reproduction, and it is necessary to correct it by using a spurious vertical synchronizing signal. But since the different magnetic heads are used in standard playing mode and long playing mode, the method of correcting the V-dancing differs, which requires additional costs for the changeover circuit and increase of adjusting points.

Referring now to the drawings, below is explained the conventional method of field still reproduction and noiseless multiple speed reproduction in standard playing mode and long playing mode by using two main magnetic heads and two auxiliary magnetic heads.

FIG. 1 shows the configuration of conventional magnetic heads and the structure of reproduction signal processing circuit. FIG. 2 represents the recording track pattern of standard playing mode, the head moving trace of field still reproduction, and reproduction signals of respective magnetic heads at that time. FIG. 3 similarly shows the recording track pattern of long playing mode, the head moving trace of field still reproduction, and reproduction signals of respective magnetic heads at that time. FIG. 4 demonstrates the recording track pattern of standard playing mode, the head moving trace of triple speed reproduction, and reproduction signals of respective magnetic heads at that time.

More specifically, FIG. 1(A) indicates the configuration of magnetic heads, in which a rotating cylinder 1 is provided with magnetic heads M1 and M2 for standard playing mode mutually differing in the azimuth and track width, together with magnetic heads S1 and S2 for long playing mode being disposed on the same rotating plane as the two magnetic heads M1 and M2 in their vicinity. As shown in FIG. 1(B), the azimuth of the magnetic head S1 disposed near the magnetic head M1 is same as that of the magnetic head M2, and the azimuth of the magnetic head S2 disposed near the magnetic head M2 is same as that of the magnetic head M1. The magnetic head M1 for standard playing mode is identical with the track pitch of standard playing mode, while M2 is narrower than M1 because it is used in field still reproduction of long playing mode. The magnetic heads S1 and S2 for long playing model are equal in the track width, which is wider than the track pitch of long playing mode.

The magnetic heads are all aligned at the track ends for the ease of height adjustment. The distance between the magnetic head M1 and magnetic head S1 and that between the magnetic head M2 and magnetic head S2 on the outer circumference of the rotating plane of magnetic heads are nH (n being an integer) supposing the distance between horizontal synchronizing signals recorded on a magnetic tape to be H. In this embodiment, for example, n=2.

This setting of the distance at an integer multiple of H is to prevent disturbance of interval of horizontal synchronizing signals due to changeover the magnetic head output signal at the time of reproduction.

The constitution for changeover of main magnetic heads and auxiliary magnetic heads is described below by referring to FIG. 1(C). In this diagram, the signals reproduced by the magnetic heads M1 and M2 for standard playing mode and magnetic heads S1 and S2 for long playing mode disposed on the rotating cylinder 1 are supplied to rotary transformers R1, R2, R3, R4, respectively, and the reproduction signals from M1 and M2 are fed to a head amplifier 2, and those from S1 and S2 are sent into another head amplifier 3. Numeral 10 denotes an to terminal of the head switching circuit synchronized with the rotation of the rotating cylinder 1, and it is connected to the head amplifiers 2 and 3. By this head switching signal, the reproduction signals from magnetic heads M1 and M2 and magnetic heads S1 and S2 are selected. The output signal of the head amplifier 2 is fed to an envelope detecting circuit 5 and a changeover switch 8. Similarly, the output signal of the head amplifier 3 is fed to an envelope detecting circuit 6 and the changeover switch 8. The envelope of reproduction signals of magnetic heads M1 and M2 for standard playing mode is detected in the envelope detecting circuit 5, whereas the envelope of reproduction signals of magnetic heads S1 and S1 for long playing mode is detected in the envelop detecting circuit 6. The output signals of the envelope detecting circuits 5 and 6 are respectively fed to the minus (−) terminal and plus (+) terminal of a comparator 7. The output of the comparator 7 is low level when the output signal from the envelope detecting circuit 5 is greater than that from the envelope detecting circuit 6, and is high level when the output signal from the envelope detecting circuit 5 is smaller than that from the envelope detecting circuit 6. The output of the comparator 7 is connected to the changeover switch 8, which is changed over so as to deliver the greater one of the reproduction signals from the magnetic heads M1 and M2 for standard playing mode and from the magnetic heads S1 and S2 for long playing mode into a reproduction signal output terminal 9.

Numeral 11 denotes a mode control signal input terminal, which is provided to feed a mode control signal to the envelope detecting circuits 5 and 6. By the mode control signal, the outputs of the envelope detecting circuits 5 and 6 are controlled when envelope comparison is not necessary in ordinary reproduction or in slow or still reproduction, and, for example, in ordinary reproduction of standard playing mode, the output of the envelope detecting circuit 5 is set to high level and that of the envelope detecting circuit 6 to low level by the mode control signal.

Also, in still reproduction, the envelope detecting circuits 5 and 6 are alternately set to high level and low level field by field. Therefore, in ordinary reproduction, the output of the comparator 7 is low level, and the changeover switch 8 is changed over to deliver the reproduction signals from magnetic heads M1 and M2 for standard playing mode into the reproduction signal output terminal 9. In still reproduction, by contrast, the output of the comparator 7 is set to high level and low level alternately field by field, and the changeover switch 8 is changed over to deliver the reproduction signals from the magnetic head M1 for standard playing mode and from the magnetic head S2 for long playing mode having the same azimuth as that of M1 into the reproduction signal output terminal 9.

In standard reproduction of long playing mode, similarly, the changeover switch 8 is changed over, and the reproduction signals of magnetic heads S1 and S2 for long playing mode are delivered to the reproduction signal output terminal 9, and in still reproduction of long playing mode, the changeover switch 8 is changed over so that the reproduction signals of the magnetic head M2 for standard playing mode and magnetic head S1 for long playing mode having the same azimuth are delivered to the reproduction signal output terminal 9 alternately field by field.

Incidentally, in the conventional example composed as shown in FIG. 1, still reproduction of standard playing mode and still reproduction of long playing mode are explained by referring to FIGS. 2 and 3.

In FIG. 2, diagram (a) represents a repetitive arrangement of record track patterns being recorded by magnetic heads M1 and M2 for standard playing mode, in which one graduation on the axis of abscissas denotes the time of one field and also represents the timing of head switching signal. The axis of ordinates shows the travel of magnetic tape, of which one graduation is equal to the length of track pitch the magnetic tape runs for in one field time in ordinary reproduction. Because of azimuth recording, the track recorded by the magnetic head M1 cannot be reproduced by the magnetic head M2. Similarly, the track recorded by the magnetic head M2 cannot be reproduced by the magnetic head M1. In FIG. 2(a), the track recorded by the magnetic head M1 is indicated by L, and that recorded by the magnetic head M2 is represented by R. The track L can be reproduced by the magnetic head S1 for long playing mode, and track R by S1. The solid line in FIG. 2(a) refers to the moving trace of magnetic heads M1 and M2 for standard playing mode in still reproduction, while the broken line indicates the moving trace of magnetic heads S1 and S2 for long playing mode. FIG. 2(b) shows a head switching signal, and while it is high, reproduction signals are obtained from the magnetic heads M1 and S1, and while it is low, reproduction signals are obtained from the magnetic heads M2 and S2. FIG. 2(c) is a reproduction envelope waveform being reproduced by the magnetic heads M1 and M2 for standard playing mode in still reproduction. FIG. 2(d) is a reproduction envelope waveform being reproduced by the magnetic heads S1 and S2 for long playing mode.

In still reproduction, in order to obtain field reproduction without picture blurring, it is changed over to obtain a reproduction signal from M1 while the head switch signal is high and one from S2 while it is low, so that the waveform as shown in FIG. 2(e) is obtained.

Referring to the same head composition, still reproduction of long playing mode is described below in relation to FIG. 3.

In FIG. 3, diagram (a) represents a repetitive arrangement of record track patterns being recorded by the magnetic heads S1 and S2 for long playing mode, in which, same as in the case of FIG. 2(a), one graduation of the axis of abscissas refers to the time of one field and also indicates the timing of head switching signal. The axis of ordinates denotes the travel of magnetic tape, of which one graduation is equal to the length of track pitch the magnetic tape runs for in one field time in recording or ordinary reproduction. Because of azimuth recording, the track recorded by the magnetic head S1 cannot be reproduced by the magnetic head S2, and similarly the track recorded by the magnetic head S2 cannot be reproduced by the magnetic head S1. In FIG. 3(a), the track recorded by the magnetic head S1 is indicated by R, and that recorded by the magnetic head S2 is L. The track R can be reproduced by the magnetic head M2 for standard playing mode, and the track L by M1. The solid line in FIG. 3(a) represents the moving trace of the magnetic heads S1 and S2 for long playing mode in still reproduction, and the broken line indicates the moving trace of the magnetic heads M1 and M2 for standard playing mode. Diagram (b) is a head switching signal.

FIG. 3(c) is a reproduction envelope waveform being reproduced by the magnetic heads M1 and M2 for standard playing mode in still reproduction. Diagram (d) shows a reproduction envelope waveform being reproduced by the magnetic heads S1 and S2 for long playing mode.

In still reproduction, in order to obtain field reproduction without picture blurring, it is changed over to obtain a reproduction signal from S1 while the head switching signal is high and one from S2 while it is low, so that the waveform as shown in FIG. 3(e) is obtained.

The shaded areas of reproduction waveforms in FIGS. 3(c), (d), (e) refer to the crosstalk components of the second adjoining tracks, and when the crosstalk components increase as compared with the reproduction signal level of the main track, a crosstalk noise appears on the reproduction screen. Accordingly, the magnetic head M2 for standard playing mode used in still reproduction of long playing mode cannot be widened like M1 because the next adjoining crosstalk components increase. The limit of crosstalk level is about −10 dB, and there is no practical problem if the crosstalk of M2 reproduction signal is about as shown in FIGS. 3(c) and (d).

Triple speed reproduction mode in such head composition is explained below by referring to FIGS. 4 and 5.

In FIG. 4, diagram (a) shows a repetitive arrangement of record track patterns being recorded by the magnetic heads M1 and M2 for long playing mode, in which an graduation on the axis of abscissas indicates the time of one field, as in the case of FIG. 2(a), and also denotes the timing of head switching signal. The axis of ordinates refers to the travel of the magnetic tape, of which one graduation is equal to the length of track pitch the magnetic tape runs for in the time of one field in recording or ordinary reproduction. Because of azimuth recording, the track recorded by the magnetic head M1 cannot be reproduced by the magnetic head M2, or the track recorded by the magnetic head M2 cannot be recorded by the magnetic head M1. In FIG. 4(a), the track recorded by the magnetic head M1 is indicated by L and the track recorded by the magnetic head M2 is R. The track R can be reproduced by the magnetic head S1 for long playing mode, and the track L by S2. The solid line in FIG. 4(a) represents the moving trace of the magnetic heads M1 and M2 for standard playing mode in triple speed reproduction, whereas the broken line indicates the moving trace of the magnetic heads S1 and S2 for long playing mode. Diagram (b) is a head switching signal. Diagram (c) is the reproduction envelope waveform being reproduced by the magnetic heads M1 and M2 for standard playing mode in triple speed reproduction, being the output signal of the head amplifier 2 in FIG. 1(c), and diagram (d) is the reproduction envelope waveform being reproduced by the magnetic heads S1 and S2 for long playing mode, being the output signal of the head amplifier 3 in FIG. 1(c). By passing the reproduction envelope waveforms in FIGS. 4(c) and (d) into envelope detecting circuits 5 and 6, being composed of, for example, known diode detecting circuits in FIG. 1(c) and comparing the envelopes in the comparator 7, the reproduction signal in FIG. 4(e) is obtained at the reproduction signal output terminal 9 by changing over the changeover switch 8. As a result, a favorable reproduction picture without noise bar is obtained in triple speed reproduction mode. The lines lying over the reproduction envelope waveforms (c), (d), and (e) in FIG. 4 indicate the changeover positions by envelope comparison.

As shown in FIG. 4, since the track width differs between the magnetic heads M1 and M2 for standard playing mode, the changeover position by envelope comparison varies between the high period and low period of the head switching signal. Accordingly, four changeover lines appear on the reproduction screen, and a vertical deviation of the reproduced picture occurs partially between two of them, which extremely lowers the grade of the reproduced picture quality.

This mode is explained by referring to FIG. 5. Diagram (a) shows the track pattern recorded by the magnetic heads M1 and M2 for standard playing mode, in which numerals 50 and 52 are the tracks recorded by the magnetic head M1 and 51 is the track pattern recorded by the magnetic head M2. The record tracks 50, 51, 52 are given horizontal synchronizing signal numbers. Horizontal synchronizing signals are, in the case of standard playing mode as is well known, recorded to be aligned with those of the adjacent track at a horizontal synchronizing signal difference of, for example, 1.5H. Besides, since signals of one field are recorded in one track and signals of one frame are recorded in two tracks, signals from the 1H-th to the 262.5H-th are recorded in the first track, and those from the 262.5H-th to the 525H-th are recorded in the second track, but the 1H-th and 263H-th are given a same number because nearly equal information is recorded in these two. In triple speed reproduction in FIG. 4, the first position of changing over from the magnetic head M1 for standard playing mode to the magnetic head S1 for long playing mode while the head switching signal is high is position A in FIG. 5(a), which is, for example, the moment of finishing the reproduction of the 8H-th of record track 50. The distance between the magnetic head gaps of magnetic head M1 for standard playing mode and magnetic head S1 for long playing mode is nH as mentioned earlier, and it is set at 2H in this embodiment, wherein the magnetic head S1 rotates ahead of the magnetic head M1. Therefore, when the magnetic head M1 is changed over to the magnetic head S1 at position A in FIG. 5(a), the horizontal synchronizing signal number of the signal being reproduced is as indicated by 53 in FIG. 5(b).

Next, the first position of changing over from the magnetic head M2 for standard playing mode to the magnetic head S2 for long playing mode while the head switching signal is low is supposed to be position B in FIG. 5(a), which is, for example, the moment of finishing of reproduction of the 4H-th of record track 51. Similarly, the magnetic head S2 is rotating ahead of the magnetic head M2. Therefore, the horizontal synchronizing signal number of the signal being reproduced at this time is as indicated by 54 in FIG. 5(b).

Track 53 in FIG. 5(b) shows reproduction signals of the first field, and 54 indicates those of the second field, which are combined together to form a reproduced image of one frame. The most important matter in these reproduction signals 53 and 54 is the period between the changeover positions A and B, and the horizontal synchronizing signal number of reproduction signal is deviated from 5, 6, 7, 8, and the horizontal synchronizing signal number of reproduction signal 54 of the next field is also deviated from 9, 10, 11, 12, by 4H each, and since the information of the first field and second field differs significantly in this period, a vertical deviation occurs on the reproduction screen, which was very uncomfortable to see.

FIG. 5 is intended to explain the principle of the problem, and in triple speed reproduction in FIG. 4 the difference between the changeover positions of the first field and second field is about 1.3 msec, and a vertical deviation occurs on the reproduction screen for the period corresponding to about 20H.

Relating now to the other problem, in the conventional head construction as described in FIGS. 2 and 3, since reproduction signals from M1 and M2 are used in standard playing mode, at the time of still reproduction, and those from S1 and S2 must be used in long playing mode, the method for correcting the spurious vertical synchronizing signal against V-dancing varies.

This aspect is described by referring to FIGS. 6 and 7. FIG. 6 relates to standard playing mode, and FIG. 7 represents long playing mode.

FIGS. 6(a), (b) indicate reproduction synchronizing signals in the vicinity of vertical synchronizing signal of reproduction signal (e) obtained by still reproduction of standard playing mode in FIG. 2. Diagram (a) is the signal reproduced by M1, and (b) is the signal reproduced by S2. In this embodiment, since there is a relative difference of 2H between main rotating heads M1, M2 and auxiliary rotating heads S1, S2, the signal (b) reproduced by the preceding head S2 has the position of vertical synchronizing signal about 2H ahead of (a). The reproduction signal near the head switching signal is, as evident from the reproduction signals in FIG. 2(c) and FIG. 3(e), lowered in the reproduction signal level and the vertical synchronizing signal may not be reproduced in the worst case due to deviation of stopping position of magnetic tape or other reason, which gives rise to the necessity of spurious vertical synchronizing signal. FIGS. 6(c), (d) are spurious vertical synchronizing signal waveforms, and the waveform (c) corresponds to the reproduction signal (a), and (d) to signal (b). The waveforms (c) and (d) are made from the head switching signal by means of monostable multivibrator (abbreviated MM hereinafter).

FIGS. 7(a), (b) are reproduction synchronizing signals in the vicinity of the vertical synchronizing signal of the reproduction signal (e) obtained by still reproduction of long playing mode in FIG. 3. Diagram (a) shows the signal reproduced by S1, and (b) is the signal reproduced by M2. As mentioned above, since the auxiliary rotating heads precede by the period of 2H, the waveform (a) is 2H ahead of waveform (b) concerning the relative positions of the reproduced vertical synchronizing signals. FIGS. 7(c), (d) are spurious vertical synchronizing signal waveforms, in which the waveform (c) corresponds to reproduction signal (a), and (d) to signal (b).

The spurious vertical synchronizing signal waveforms (c), (d) must be inserted earlier than the actual vertical synchronizing signals. If inserted too earlier, however, the TV reproduction screen is lowered, but it all right if inserted several Hs earlier.

The spurious vertical synchronizing signal (c) made from the rise of head switching signal is identical in both standard playing mode and long playing mode, and the waveform (d) in FIG. 6 of standard mode made from the fall of head switching signal precedes the waveform (c) in FIG. 6 by about 2H. This gap of about 2H is due to the indexing error of mounting of the rotating magnetic heads of other cause, and it must be adjusted in relation to the correction of V-dancing.

Similarly, the waveform (d) in FIG. 7 of long playing mode is about 2H behind the waveform (c) in FIG. 7. Since different heads are used in long playing mode, the indexing error of mounting of the magnetic heads varies and a separate adjustment is needed, and MMs are necessary respectively for standard playing mode and long playing mode, which must be changed over according to the mode.

As described above, in a conventional video tape recorder in which magnetic heads for standard playing mode and magnetic heads for long playing mode are disposed closely and the track width of one of the magnetic heads for standard playing mode is made narrower so as to realize field still reproduction of long playing mode, noise bar does not appear on the reproduction screen in multiple speed reproduction mode, but a vertical deviation occurs partially and favorable multiple speed reproduced pictures cannot be obtained.

A similar problem occurs at other n times speed than triple speed, too. For example, at 9 times speed, the width of the vertical deviation is about 7H, or ⅓ that of triple speed, but it occurs in three positions on the screen, and the total is about 20H, nearly same as that of triple speed.

Also, in field still reproduction, spurious vertical synchronizing signal waveforms must be changed over for standard playing mode and long playing mode for correcting V-dancing, and two adjusting points were necessary.

SUMMARY OF THE INVENTION

It is a main object of this invention to provide video tape recorder capable of bringing about favorable reproduced pictures in multiple speed reproduction and field still reproduction.

In order to achieve this object, a video tape recorder of the present invention is one of helical scan type permitting the magnetic tape to run at a constant first speed or second speed (the first speed being faster than the second speed) when recording, wherein first and second magnetic heads differing mutually in the azimuth are provided at positions of 180° of a rotating substrate, and third magnetic head of which azimuth is different from that of said first magnetic head but equal to that of said second magnetic head, and fourth magnetic head of which azimuth is different from that of said second magnetic head but equal to that of said first magnetic head are disposed at positions of 180° of the rotating head substrate in the vicinity of the first and second magnetic heads, and the first and second magnetic heads are used when recording at said first speed and the third and fourth magnetic heads are used when recording at said second speed, in which the first and second magnetic heads are of a same track width and the third and fourth magnetic heads are of a same track width, and the four heads are installed so as to align the centers of track widths of the first and second magnetic heads, and of the third and fourth magnetic heads.

The above and other objects and features of the present invention will be more clearly understood by referring to the explanations of several embodiments discussed in details along with the accompanying drawings below.

DESCRIPTION OF THE PREFERRED EMBODIMENTS

Embodiments of this invention will be described below by referring to the accompanying drawings.

Figure 1A:
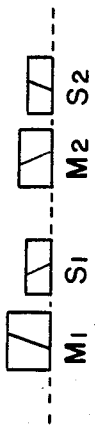
FIGS. 1(a)–(c) illustrate the head composition and reproduction signal processing system of a conventional video tape recorder.
Figure 8A:
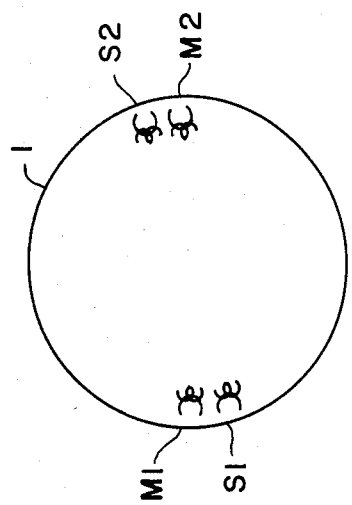
FIGS. 8(a)–(b) are layout examples of the head composition in a video tape recorder according to this invention.
Figure 8B:
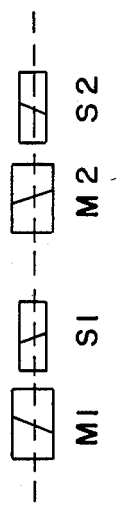
Figure 6A:
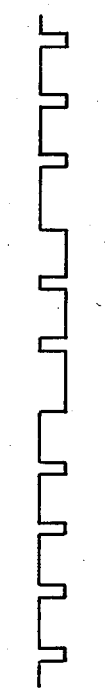
FIGS. 6(a)–(d) are drawings used to explain the V-dancing in still reproduction of standard playing mode in FIG. 2.
Figure 6B:
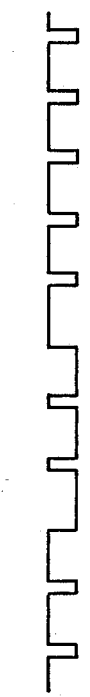
Figure 6C:
Figure 6D:
Figure 7A:
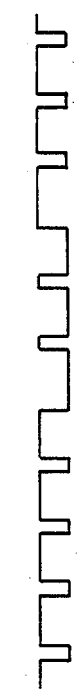
FIGS. 7(a)–(d) are drawings used to explain the V-dancing in still reproduction in long playing mode in FIG. 3.
Figure 7B:
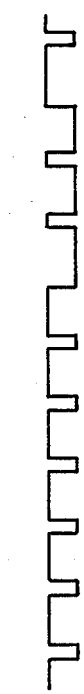
Figure 7C:
Figure 7D:
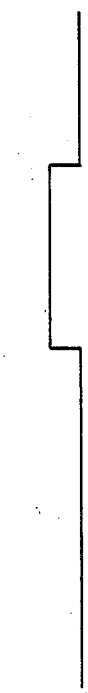

FIG. 8 illustrates a layout example of the magnetic heads in one of the embodiments of this invention. In this drawing, the identical constituent elements as shown in FIG. 1 are given same part numbers. In FIG. 8, diagram (A) shows the disposition of magnetic heads, in which a rotating cylinder 1 is provided with magnetic heads M1 and M2 for standard playing mode differing mutually in the azimuth, together with magnetic heads S1 and S2 for long playing mode, same as shown in FIG. 1(A).

Figure 1B:
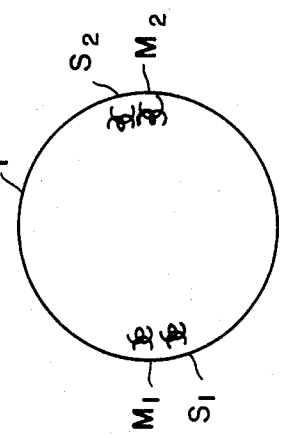
Figure 1C:
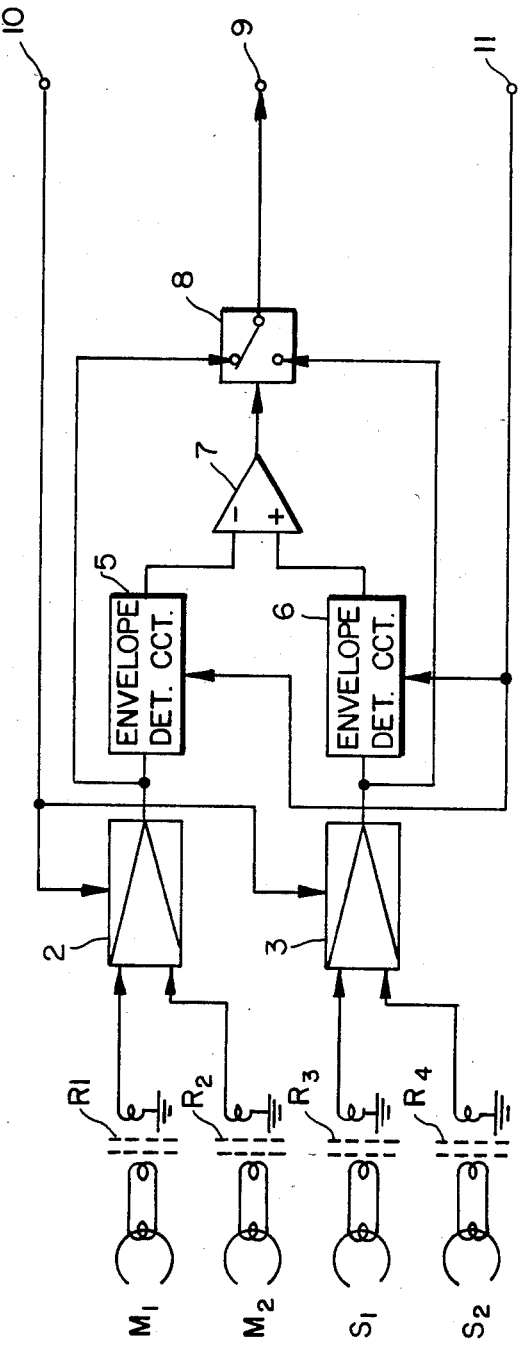
Figure 2A:
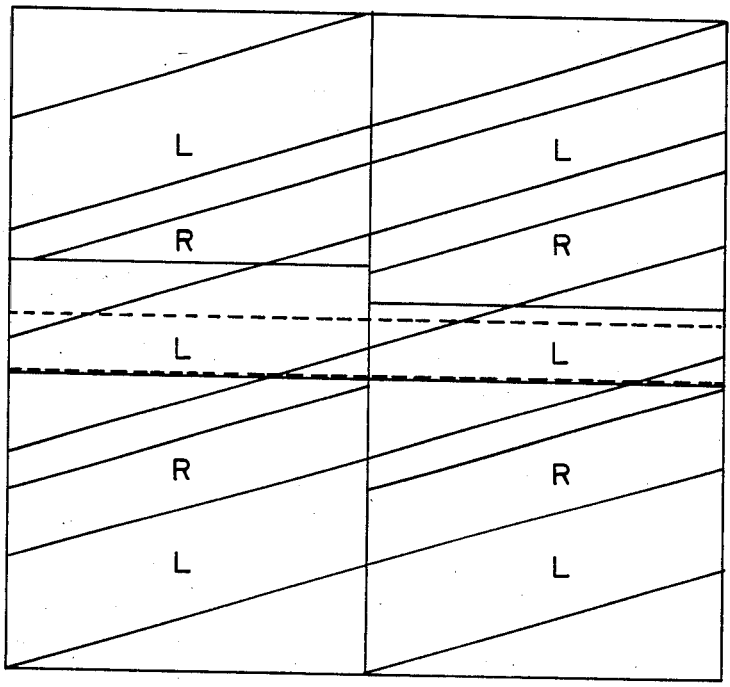
FIGS. 2(a)–(e) are drawings used to explain still reproduction of standard playing mode in the prior art.
Figure 2B:
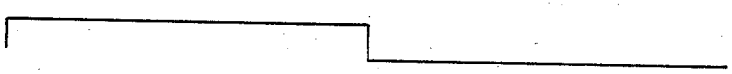
Figure 2C:
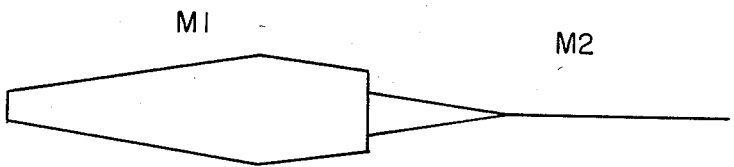
Figure 2D:
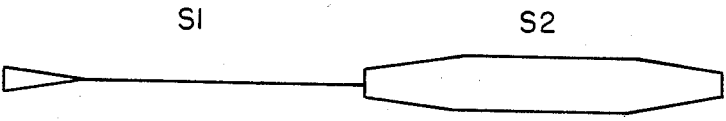
Figure 2E:
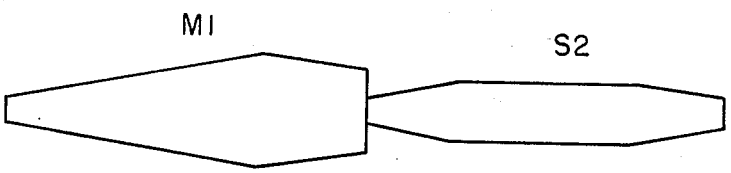
Figure 3A:
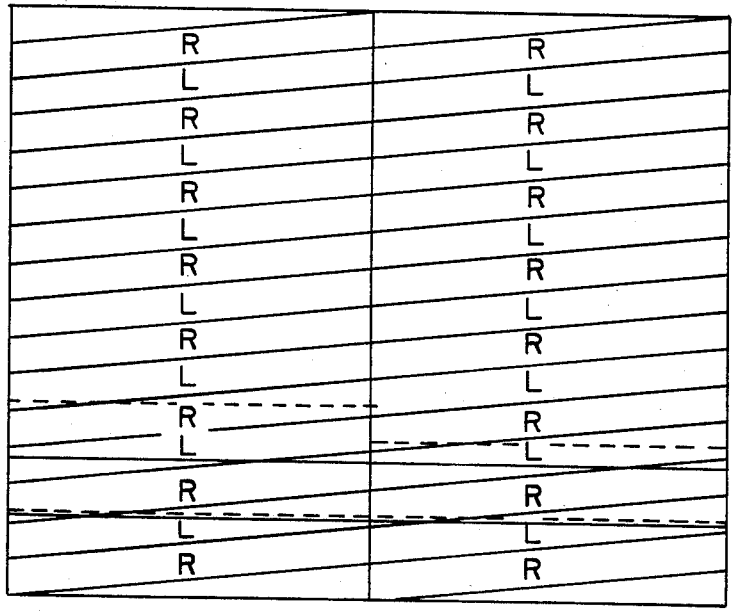
FIGS. 3(a)–(e) are drawings used to explain still reproduction in long playing mode in the prior art.
Figure 3B:
Figure 3C:
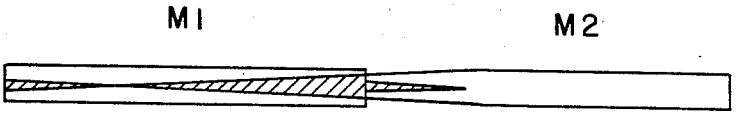
Figure 3D:
Figure 3E:
Figure 4A:
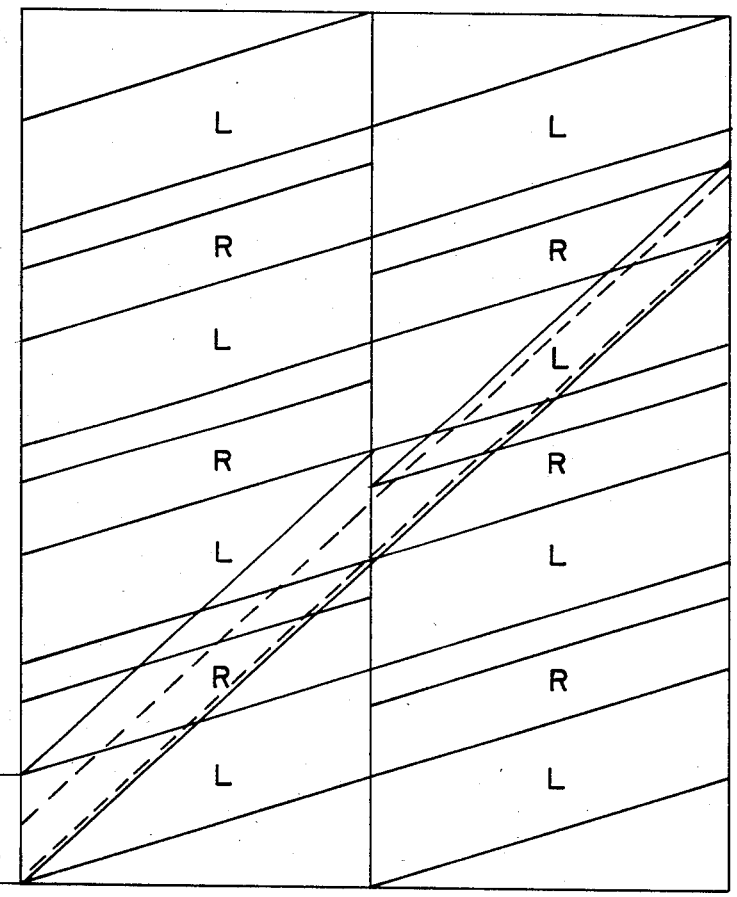
FIGS. 4(a)–(e) are drawings used to explain triple speed reproduction of standard playing mode in the prior art.
Figure 4B:
Figure 4C:
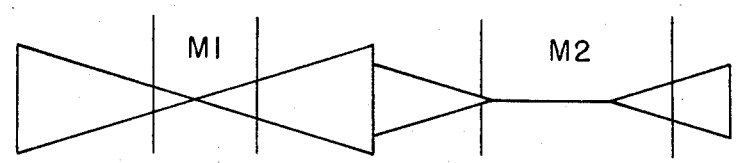
Figure 4D:
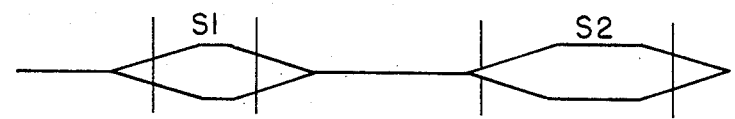
Figure 4E:
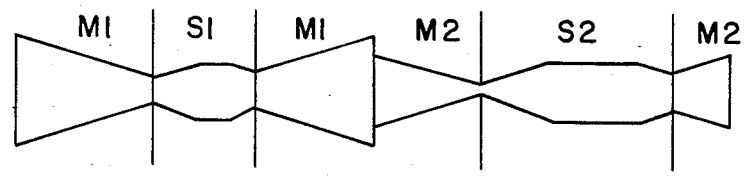
Figure 5A:
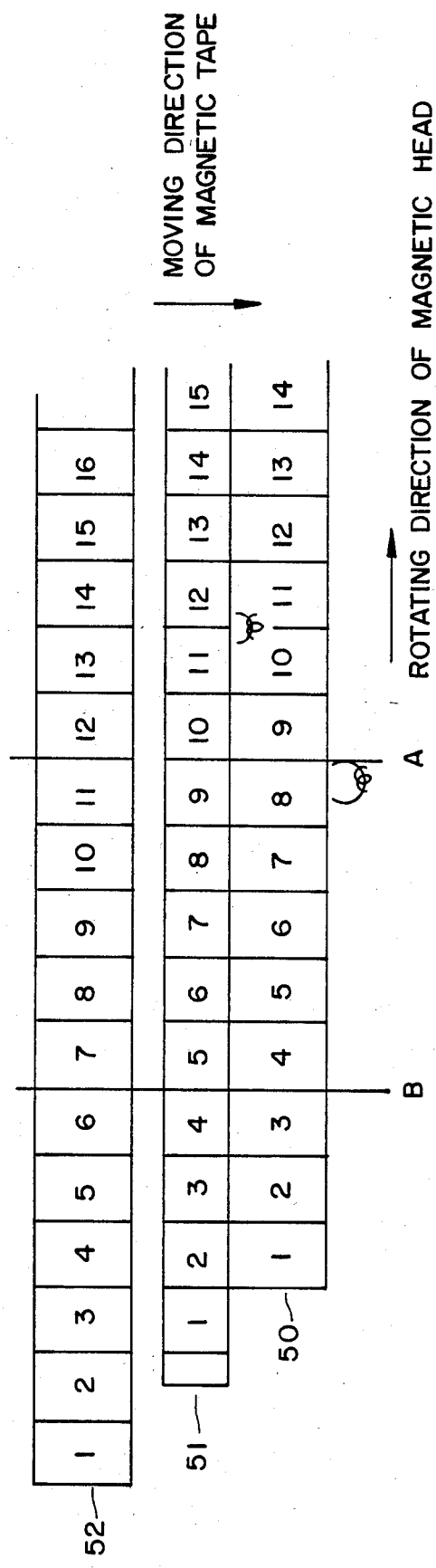
FIGS. 5(a)–5(b) illustrate the mechanism of occurrence of partial vertical deviation during multiple speed reproduction in the prior art.
Figure 5B:
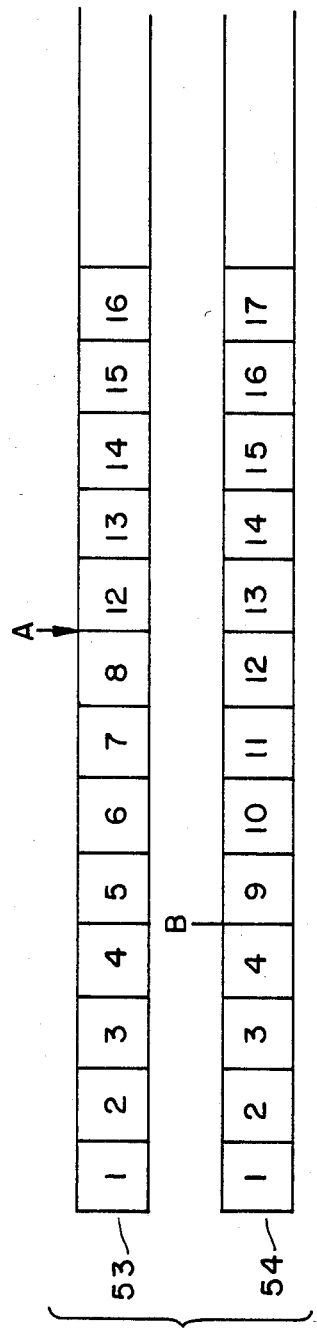

As shown in FIG. 1(B), the relative heights of magnetic heads M1 and M2 for standard playing mode and of magnetic heads S1 and S2 for long playing mode are determined to align the centers of the track widths, and the track width is, assuming the track pitch of long playing mode to be TP2, set at $2 \times TP2$ for the magnetic heads for standard playing mode, and $1.5 \times TP2$ for the magnetic heads for long playing mode. The block diagram of reproduction signal processing system is identical with that in FIG. 1(C).

The magnetic heads M1 and M2 are remote from each other by 180°, so are the magnetic heads S1 and S2.

The distance between the magnetic head M1 and magnetic head S2 on the outer circumference of the rotating plane of the magnetic heads, and the distance between the magnetic head M2 and magnetic head S2 are set nH (n being an integer) assuming the distance between horizontal synchronizing signals recorded on a magnetic tape to be H. Setting of this distance in an integer multiple of H is to prevent disturbance of interval of horizontal synchronizing signals due to changeover of the magnetic head output signals.

In this embodiment, the operation of triple speed reproduction mode is explained by referring to FIG. 9. In this drawing, (a) shows a repetitive arrangement of record track patterns recorded by the magnetic heads M1 and M2 for standard playing mode, wherein one graduation of the axis of abscissas refers to the time of one field, and also indicates the timing of head switching signal. The axis of ordinates represents the travel of magnetic tape, and its one graduation indicates the track pitch length the magnetic tape runs in one field time in ordinary reproduction. Because of azimuth recording, the track recorded by the magnetic head M1 cannot be reproduced by the magnetic head M2, or the track recorded by the magnetic head M2 cannot be reproduced by the magnetic head M1. In FIG. 9(a), the track recorded by the magnetic head M1 is indicated by L and the track recorded by the magnetifc head M2 is R. The track R can be reproduced by the magnetic head S1 for long playing mode, and the track L can be reproduced by S2. The solid line in FIG. 9(a) refers to the moving trace of magnetic heads M2 and M2 for standard playing mode in triple speed reproduction, while the broken line indicates the moving trace of magnetic heads S1 and S2 for long playing mode. Diagram (b) is a head switching signal. Diagram (c) is the reproduction envelope waveform being reproduced by the magnetic heads M1 and M2 for standard playing mode in triple speed reproduction, being the output signal of the head amplifier 2 in FIG. 1(C). Diagram (d) is the reproduction envelope waveform being reproduced by the magnetic heads S1 and S2 for long playing mode, being the output signal of the head amplifier 3 in FIG. 1(C).

Figure 9A:
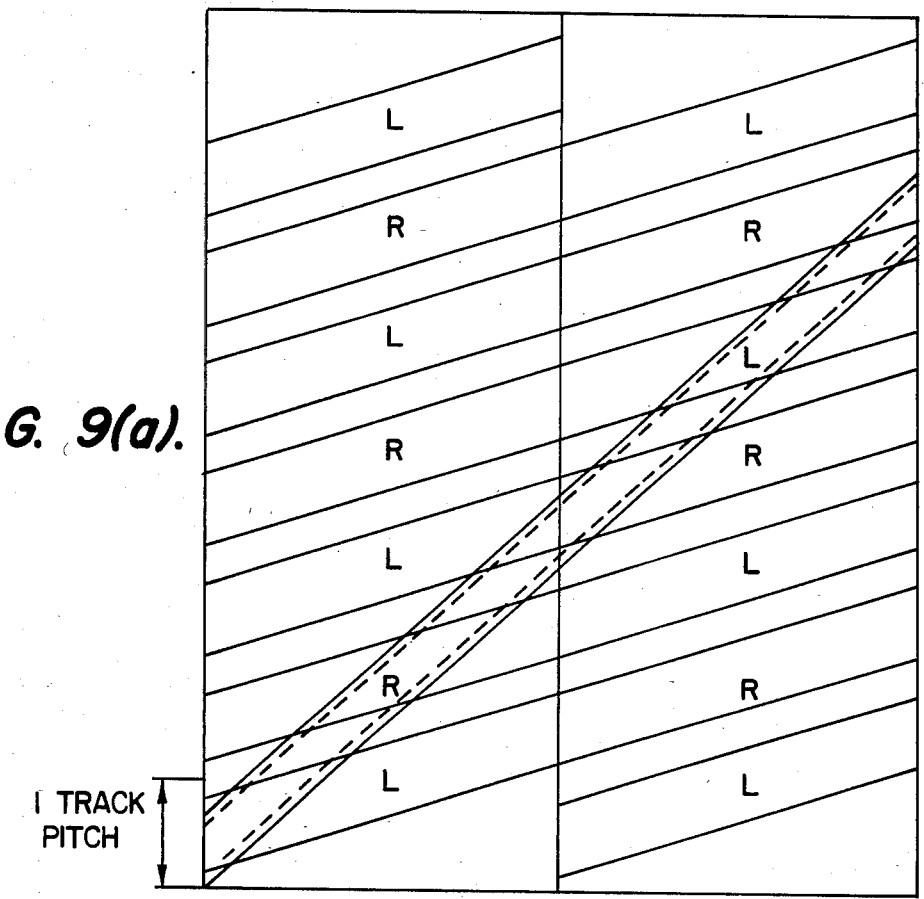
FIGS. 9(a)–(e) are drawings used to explain triple speed reproduction mode in one of the embodiments of the present invention.
Figure 9B:
Figure 9C:
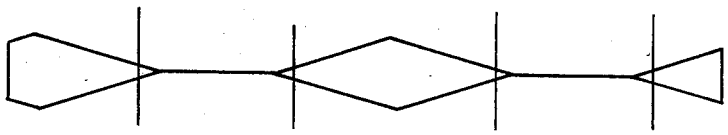
Figure 9D:
Figure 9E:
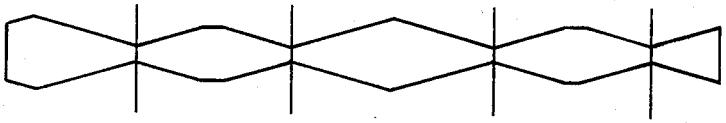

The reproduction envelope waveforms in FIGS. 9(c) and (d) are, for example, passed into envelope detecting circuits made of known diode detecting circuits, and the envelopes are compared in a comparator 7, and by changing over a changeover switch 8, the reproduction signal in FIG. 9(e) is obtained at the reproduction signal output terminal 9. As a result, in this embodiment, a favorable reproduced picture free of noise bar may be obtained in triple speed reproduction mode. Meanwhile, the lines lying over the reproduction envelope waveforms (c), (d) and (e) in FIG. 9 indicate the changeover positions due to envelope comparison.

As shown in FIG. 9, since the track width is identical in the magnetic heads M1 and M2 for standard playing mode, the signal waveforms reproduced in the "high" period and "low" period of head switching signal level are identical, so that the changeover position due to envelope comparison is nearly the same.

Since the changeover positions of the first field and second field are same, vertical deviation of the reproduced picture due to difference in changeover position does not occur, and four changeover lines visually appear to be only two lines, so that the grade of picture quality may be notably enhanced.

Thus, according to this embodiment, by setting the magnetic heads M1 and M2 for standard playing mode in a same track width and the magnetic heads S1 and S2 for long playing mode also in a same track width, the changeover position of the reproduction signal in multiple speed reproduction is made same in the first field and second field, so that the partial vertical deviation of the reproduced picture may be eliminated, and moreover that the number of changeover lines may be visibly reduced to half of the conventional picture to realize a favorable reproduced picture. In this embodiment, the track width of the magnetic heads M1 and M2 for standard playing mode is set twice the track pitch TP2 of long playing mode, in which by aligning the centers of the track widths a favorable reproduced picture without noise bar may be obtained at the changeover point of the reproduction signals in multiple speed reproduction of standard mode without setting the magnetic head M1 for standard playing mode wider than M2 as in the prior art. Meanwhile, the track width of magnetic heads M1 and M2 for standard playing mode cannot be made so wide because it is determined by the crosstalk noise level of the next adjoining track when used in still reproduction of long playing mode, but by aligning the center of the track widths, the width can be increased notably from the magnetic head for standard playing mode used in still reproduction of long playing mode in the conventional construction. Therefore, the field still reproduced picture of nearly the same quality as in the prior art and the multiple speed reproduced picture improved from the prior art may be obtained.

In the head composition of the present invention, still reproduction of standard playing mode and still reproduction of long playing mode are explained below by referring to FIGS. 10 and 11.

In FIG. 10, diagram (a) shows a repetitive arrangement of record track patterns being recorded by the magnetic heads M1 and M2 for standard playing mode, in which one graduation of the axis of abscissas refers to the time of one field, and also indicates the timing of head switching signal. The axis of ordinates represents the travel of magnetic tape, and its one graduation indicates the track pitch length the magnetic tape runs in one field time in ordinary reproduction or recording. Because of azimuth recording, the track recorded by the magnetic head M1 cannot be reproduced by the magnetic head M2, or the track recorded by the magnetic head M2 cannot be reproduced by the magnetic head M1. In FIG. 10(a), the track recorded by the magnetic head M1 is indicated by L, and the track recorded by the magnetic head M2 is R. The track R can be reproduced by the magnetic head S1 for long playing mode, and the track L can be reproduced by S2. The solid line in FIG. 10(a) shows the moving trace of magnetic heads M1 and M2 for standard playing mode in still reproduction, and the broken line indicates the moving trace of magnetic heads S1 and S2 for long playing mode. Diagram (b) is a head switching signal. Diagram (c) is the reproduction envelope waveform reproduced by the magnetic heads M1 and M2 for standard playing mode in still reproduction, and diagrams (d) is the reproduction envelope waveform reproduced by the magnetic heads S1 and S2 for long playing mode.

Figure 10A:
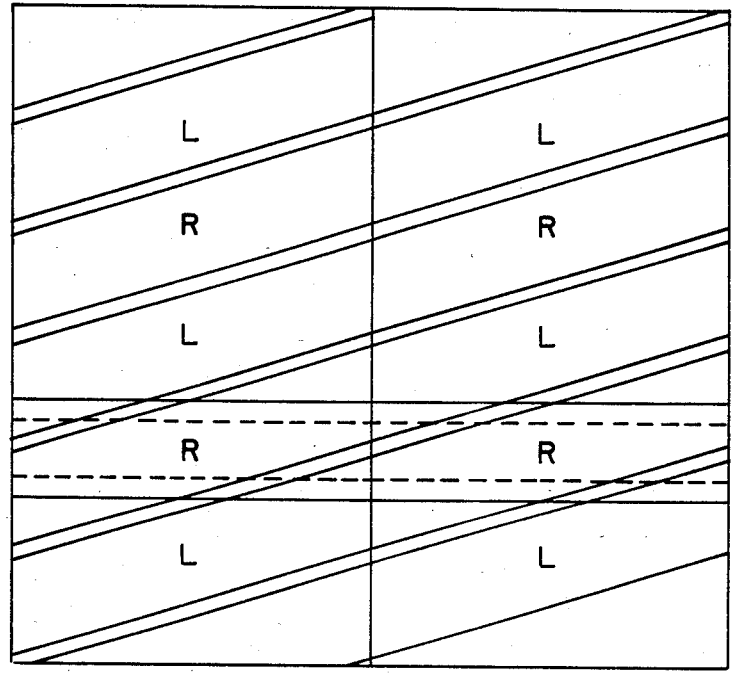
FIGS. 10(a)–(e) are drawings used to describe still reproduction of standard playing mode in one of the embodiments of the present invention.
Figure 10B:
Figure 10C:
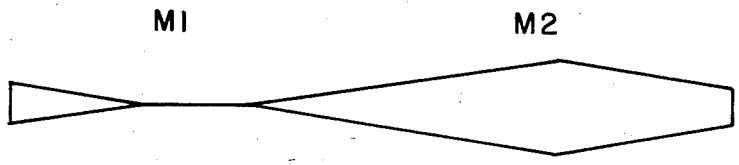
Figure 10D:
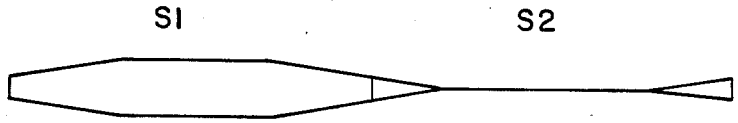
Figure 10E:
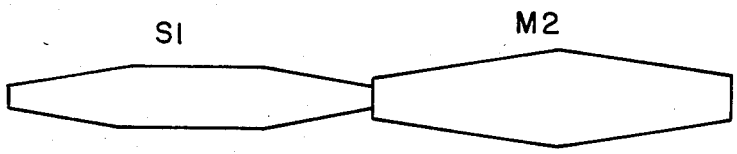

In still reproduction, in order to achieve field reproduction without picture blurring and to constitute to use same magnetic heads as in still reproduction of long playing mode, it is changed over to obtain the reproduction signal of S1 while the head switching signal is high and the reproduction signal of S2 while it is low, so that the waveform is obtained as shown in FIG. 10(e). Using the head composition of this invention as shown in FIG. 8, still reproduction of long playing mode is explained below by referring to FIG. 11.

In FIG. 11, diagram (a) is a repetitive arrangement of record track patterns being recorded by the magnetic heads S1 and S2 for long playing mode, in which one graduation of the axis of abscissas denotes the time of one field, as in the case of FIG. 10(a), and also indicates the timing of head switching signal. The axis of ordinates represents the travel of magnetic tape, and its one graduation is equal to the track pitch length the magnetic tape runs for in one field time in recording or in ordinary reproduction. Because of azimuth recording, the track recorded by the magnetic head S1 cannot be reproduced by the magnetic head S2, or the track recorded by the magnetic head S2 cannot be reproduced by the magnetic head S1. In FIG. 11(a), the track recorded by the magnetic head S1 is indicated by R and the track recorded by the magnetic head is L. The track R can be reproduced by the magnetic head M2 for standard playing mode, and the track L can be reproduced by M1. The solid line in FIG. 11(a) refers to the moving trace of magnetic heads S1 and S2 for long playing mode in still reproduction, while the broken line denotes the moving trace of magnetic heads M1 and M2 for standard playing mode. Diagram (b) is a head switching signal. Diagram (c) is the reproduction envelope waveform being reproduced by the magnetic heads M1 and M2 for standard playing mode at the time of still reproduction. Diagram (d) is the reproduction envelope waveform being reproduced by the magnetic heads S1 and S2 for long playing mode.

Figure 11A:
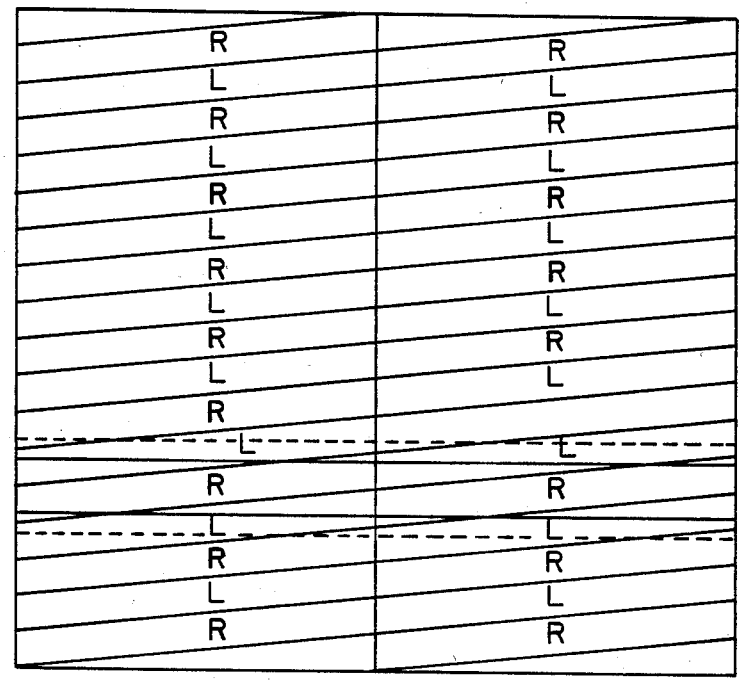
FIGS. 11(a)-(e) are drawings used to explain still reproduction in long playing mode in one of the embodiments of the present invention.
Figure 11B:
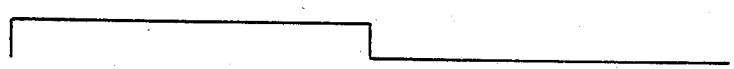
Figure 11C:
Figure 11D:
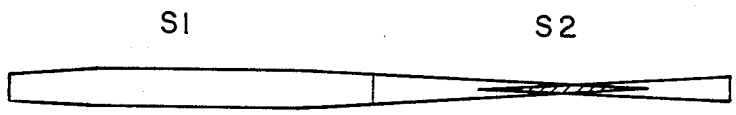
Figure 11E:
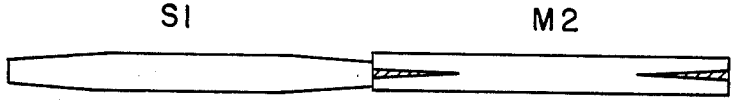

In still reproduction, in order to achieve field reproduction without picture blurring, the waveform as shown in FIG. 11(e) is attained by changing over so as to obtain the reproduction signal of S1 while the head switching signal is high and the reproduction signal of S2 while it is low.

In this head composition, the method of V-dancing correction by spurious vertical synchronizing signals in the case of performing still reproduction of standard playing mode and long playing mode by the same heads is explained in relation to FIG. 12.

Figure 12A:
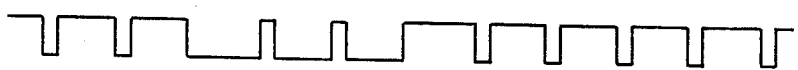
FIGS. 12(a)-(f) are drawings used to describe the V-dancing correction of still reproduction in the embodiments of this invention explained in FIGS. 10 and 11.
Figure 12B:
Figure 12C:
Figure 12D:

FIGS. 12(a), (b) are reproduction synchronizing signals in the vicinity of the vertical synchronizing signals of the reproduction signals (e) obtained by still reproduction of standard playing mode in FIG. 10. That is, diagram (a) is the signal reproduced by S1 and (b) is the one by M2. FIGS. 12(c), (d) refer to reproduction signals in the vicinity of vertical synchronizing signals of the reproduction signals (e) obtained by still reproduction of long playing mode in FIG. 11. That is, diagram (c) is the signal reproduced by Si and (d) is the one by M2.

Figure 12E:
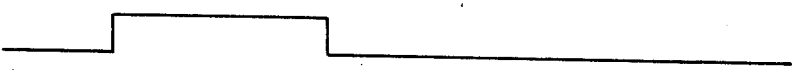
Figure 12F:

FIGS. 12(e), (f) show spurious vertical synchronizing signals for V-dancing correction. The reproduced vertical synchronizing signal positions differ in standard playing mode and long playing mode, but because of reproduction by the same heads, the relative difference is identical between the vertical synchronizing signal reproduced by S1 of standard playing mode and long playing mode and the vertical synchronizing signal reproduced by M2. Therefore, by fixing the spurious vertical synchronizing signal in FIG. 12(e) and adjusting the spurious vertical synchronizing signal position in (f), it is not necessary to change over the spurious vertical synchronizing signal between standard playing mode and long playing mode, and only one adjusting position is sufficient, so that the cost may be notably reduced.

Thus, in this embodiment, the V-dancing correction by spurious vertical synchronizing signals may be facilitated by setting the magnetic heads M1 and M2 for standard playing mode in a same track width and the magnetic heads S1 and S2 for long playing mode also in a same track width, by aligning the centers of the respective track widths, and by using same heads in still reproduction of standard playing mode and long playing mode without hardly lowering the reproduction output from the conventional level.

In the explanation of this embodiment, heads S1 and M2 are used in still reproduction, but it is the same when it is composed to use M1 and S2 in still reproduction of standard playing mode and long playing mode.

As evident from the explanation above, this invention relates to a video tape recorder of helical scan type comprising magnetic heads for standard playing mode and magnetic heads for long playing mode, in which the centers of respective track widths are aligned to set the magnetic heads M1 and M2 for standard playing mode in a same track width and the magnetic heads S1 and S2 for long playing mode also in a same track width, so that the reproduction signal waveforms of the first field and second field may be made identical to eliminate the partial vertical deviation occurring at the time of multiple speed reproduction and reduce the number of changeover lines of reproduction signals to half, which results in a favorable picture in multiple speed reproduction. Furthermore, since same heads can be used in still reproduction of standard playing mode and long playing mode, only one position is sufficient for V-dancing correction by spurious vertical synchronizing signals. Moreover concerning the changeover of the magnetic heads depending on whether the head switching signal is high or low, since it is identical in standard playing mode and long playing mode, it is not necessary to change according to the time mode.

Yet the timing of changing from still reproduction to slow motion reproduction is similar and the setting is easy, so that the circuit composition may be simplified, which may also contribute to sizable reduction of cost.

Also, by correcting the difference in horizontal synchronizing signal at the time of changeover of reproduction signal in multiple speed reproduction by using a delay curve, a favorable multiple speed reproduction picture of high grade being free of noise or skew may be obtained.

This invention may be executed in many other forms without departing from the spirit or main features. Therefore, the foregoing embodiments are mere illustrations in all aspects and should not be interpreted definitely. The scope of this invention is indicated by the claims, and is not restricted in any respect by the text of the Specification. All modifications and changes belonging to the equal range of the claims are included in the scope of this invention.

What is claimed is:

1. A video tape recorder of helical scan type being constructed, permitting a magnetic tape to run at a constant first or second speed (the first speed being faster than the second speed) at the time of recording, by providing first and second magnetic heads mutually differing in the azimuth at positions of 180° of a rotating substrate, disposing a third magnetic head of which azimuth is different from that of said first magnetic head but equal to that of said second magnetic head and a fourth magnetic head of which azimuth is different from that of said second magnetic head but equal to that of said first magnetic head at positions of 180° of a rotating head substrate in the vicinity of the first and second magnetic heads respectively, and using the first and second magnetic head when recording at said first speed and using the third and fourth magnetic heads when recording at said second speed, wherein the track widths of the first and second magnetic heads are equal and the track widths of the third and fourth magnetic heads are equal, and the centers of the track widths of the first and second magnetic heads and of the third and fourth magnetic heads are aligned.

2. A video tape recorder as set forth in claim 1, wherein the track width TW1 of the first and second magnetic heads is wider than that TW2 of the third and fourth magnetic heads, and assuming the track pitch of the first speed to be TP1 and that of the second speed to be TP2 and setting the track pitch of the first speed as $TP1 = 3 \times TP2$, and track width is set as follows:

$$2 \times TP2 \leqq TW1 \leqq 3 \times TP2$$

$$TP2 \leqq TW2 \leqq 2 \times TP2$$

3. A video tape recorder as set forth in claim 1, wherein the magnetic tape recorded at the first or second speed is reproduced by the second magnetic head and third magnetic head at the time of still reproduction, or by the first magnetic head or fourth magnetic head.

* * * * *